United States Patent Office 3,191,108
Patented June 22, 1965

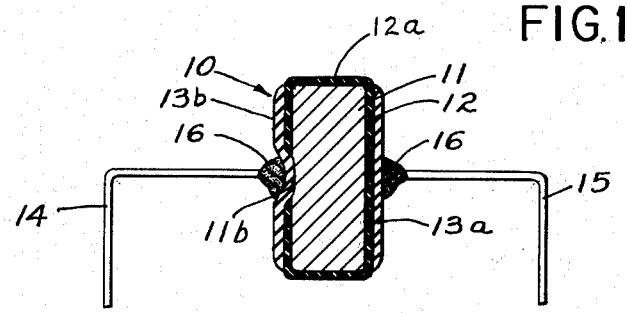
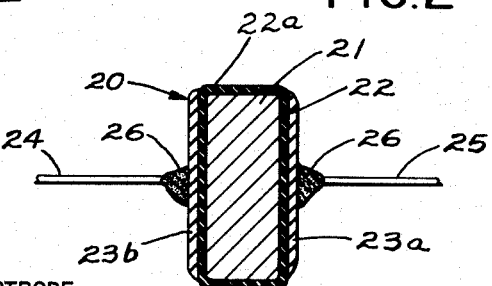
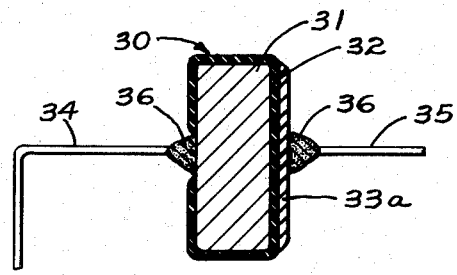

3,191,108
ELECTRICAL CAPACITOR AND METHOD
OF MAKING THE SAME
Otis F. Boykin, Chicago, Ill., assignor to CTS Corporation, Elkhart, Ind., a corporation of Indiana
Filed Oct. 3, 1962, Ser. No. 228,004
8 Claims. (Cl. 317—258)

This invention relates to electrical capacitors, generally, and in particular to electrical capacitors which use a dielectric material which is a compound of one of the electrodes of the capacitor.

Specifically this invention relates to a capacitor which uses tantalum or titanium as one electrode and a dielectric material which is a compound of one of these metals and which is formed in place on the surface of the electrode.

There is a need in the electronic industry for capacitors having high capacity and small volume. It is also desirable for these capacitors to have high dielectric breakdown and low dissipation factors. These types of capacitors are particularly needed for use in the present "Swiss Cheese" or "Breadboard" concept of electronic packaging. Being unusually small and cylindrically shaped they are commonly called "dot" capacitors.

It is a principal object of this invention to provide a capacitor having these desirable characteristics in addition to providing a simple inexpensive method of manufacturing such a capacitor.

Lead titanate, lead tantalate, and the oxides of tantalum and titanium are all well known ceramic dielectric materials having good dielectric constants. It is also an object of this invention and one of its principal features to provide a method of forming a mixture of lead titanate and titanium dioxide and a mixture of lead tantalate and tantalum pentoxide in place on an electrode of either tantalum or titanium in such a way as to produce capacitors having consistently reproducible electrical characteristics.

It is a further object of this invention to provide a unique method of converting the oxides of tantalum and titanium to lead tantalate and lead titanate, respectively.

Other objects and advantages of the present invention will be apparent from a reading of the following detailed description of the preferred method of producing capacitors in accordance therewith.

Briefly the invention comprises placing a body of tantalum or titanium in a furnace in an oxidizing atmosphere; firing the body for a sufficient length of time to form thereon a layer of the oxide of the material; impregnating the oxide coating with a liquid resinate solution containing lead; refiring the body to decompose the resinate solution and cause the lead to react with the oxide layer and convert a portion of the oxide to either lead titanate or lead tantalate as the case may be; and attaching an electrically conductive layer to the dielectric coating thus formed on the body to complete the construction of the capacitor.

For a better understanding of the present invention, reference may be had to the accompanying drawings wherein the same reference numerals have been applied to like parts and wherein:

FIGURE 1 is a substantially enlarged sectional view of an improved electrical capacitor made in accord with the present invention;

FIGURE 2 is a substantially enlarged sectional view of another embodiment of an electrical capacitor of the present invention;

FIGURE 3 is a substantially enlarged sectional view of still another embodiment of an electrical capacitor of the present invention;

FIGURE 4 is a diagrammatical representation of this invention; and

FIGURE 5 is an enlarged section of FIGURE 1, the layers being identified in legend form.

Referring now to FIGURE 1 of the drawings, there is illustrated an electrical capacitor, generally indicated at 10, comprising a body 11 of a metal such as tantalum or titanium having a layer or film 12 of an oxide of the metal of the body 11 bonded to the body 11. Preferably, the body 11 is in the form of a cylinder having a substantially round center section and parallel ends. Inasmuch as the capacitor 10 is designed particularly for insertion into an apertured substrate, connotatively referred to as "Swiss cheese" electronic packaging, the length of the center section is usually less than the diameter of the cylinder, e.g., a capacitor made in accord with the invention has a length or thickness of .030 inch while the diameter is .100 inch. A compound 12a of a lead tantalate or lead titanate, the compound depending upon the metal of the body, coats the outer surface of the layer 12 of the oxide of the metal 11 but does not penetrate the inner surface of the layer 12, i.e., the surface contiguous to the surface of the body 11. Bonded to the compound covering the ends of the body is a pair of conductive members 13a and 13b. In a preferred form of the invention, one of the members 13b is connected directly to the body 11 by mechanically removing a portion of the layer 12 of the oxide of the metal and the compound 12a at the one end 11b of the body 11 before applying the conductive member 13b. Thus the body 11 of the metal actually defines one of the electrodes and the member 13a defines the other of the electrodes, and the dielectric is defined by the layer 12 of the oxide of the metal 11 and the compound 12a coating the outer layer of the oxide of the metal. Leads 14 and 15 are fixedly secured to the conductive members 13a and 13b in a suitable manner with metal deposits 16.

The following specific examples illustrate the variety of capacitors which can be produced using this invention:

EXAMPLES 1–3

Three pellets of titanium .100″ in diameter and .030″ thick were placed in a kiln and fired. All were fired for ten minutes, however, each was fired at a different temperature. Pellet Number 1 was fired at 900° C.; Number 2 at 875° C.; and Number 3 at 840° C. The firing produced a titanium oxide layer on each pellet of ranging thickness. The pellets were then cooled to room temperature and placed in a bath of liquid lead resinate. These were then again placed in the kiln and fired at 800° C. for five minutes to thermally decompose the lead resinate and to cause the lead to react with the oxide layer to form lead titanate. All of the oxide is not converted so the result is a mixture of titanium oxide and lead titanate. If all of the oxide were converted the bond between the dielectric layer and the inner core of metal would be destroyed and the dielectric layer would brush away from the metal destroying the capacitor.

So that the inner core of titanium could serve as one electrode of the capacitor, one end of the cylindrical member was sandblasted until the inner core of titanium was exposed. Silver paste was then screened over the exposed area and on the opposite end to provide electrodes for the capacitor. The one electrode is electrically connected to the inner core of titanium so that it also functions as part of one electrode. Each pellet was then refired to adhere the silver to the dielectric.

This completed the manufacture of the capacitors. On test at one megacycle at a temperature of 25° C. these capacitors had the following characteristics:

*Table I*

|  | Firing Time | Capacity, pfd. | Q |
|---|---|---|---|
| No. 1 | 10 Min., 900° C | 750 | 100 |
| No. 2 | 10 Min., 875° C | 990 | 175 |
| No. 3 | 10 Min., 840° C | 1,850 | 150 |

Further electrical tests were conducted on the capacitors at a number of temperatures between 15° C. and 85° C. It was found that throughout this temperature range their capacity varied only to a minor degree giving a temperature coefficient for each of approximately 2 percent.

In another embodiment of the present invention, as shown in FIGURE 2 of the drawings, the electrical capacitor 20 is substantially the same as the capacitor 10 shown in FIGURE 1 of the drawings and comprises a body 21 of a metal such as tantalum or titanium having a layer 22 of an oxide of the metal bonded to the body 21. The outer portion of the layer 22 of the oxide of the metal is impregnated with a coating 22a of a compound of lead tantalate or lead titanate in the same manner as the capacitor 10 shown in FIGURE 1 of the drawings, and bonded to the outer surfaces of the coating 22a covering the ends of the body 21 is a pair of electrodes 23a and 23b. Leads 24 and 25 are connected to the electrodes 23a and 23b in a suitable manner with metal deposits 26. In accord with the present invention, the body 21 is actually a common electrode connecting two capacitors in series, i.e., the electrical capacitor 20 shown in FIGURE 2 of the drawings is the equivalent of two capacitors connected in series; therefore, the capacitance thereof is equal to one half of the capacitance of the electrical capacitor 10 shown in FIGURE 1 of the drawings, assuming that the elements thereof are otherwise the same.

EXAMPLES 4–9

Here cylindrical bodies of tantalum having the same physical dimensions as in the previous example were fired in a kiln at 800° C. for varying lengths of time. Firing temperatures in the kiln may be reduced to as low as 700° C. by altering the firing cycle for forming a layer of oxide on the cylindrical body. The firing time for each is set out below in Table II. After this initial firing to form a layer of oxide, the bodies were bathed in a liquid lead resinate solution and refired for ten minutes in the kiln to decompose the resinate and react the lead with the tantalum oxide to produce lead tantalate. Here again all of the oxide was not converted so that the bond between the oxide and the inner metal would not be broken.

After this second firing the bodies were terminated in the same manner as were Examples 1–3. These capacitors were then subjected to electrical tests with the following results:

*Table II*

|  | Firing Time, minutes | Capacity, pfd. | Q |
|---|---|---|---|
| No. 4 | 5 | 150 | 50 |
| No. 5 | 10 | 90 | 75 |
| No. 6 | 15 | 65 | 90 |
| No. 7 | 20 | 45 | 150 |
| No. 8 | 25 | 40 | 200 |
| No. 9 | 30 | 38 | 300 |

In all of the above examples a portion of the dielectric which is formed on the body of metal was removed in order that the intercore of metal could act as one of the electrodes of the capacitor. This would not necessarily always be the case. By leaving the dielectric film intact and by attaching two separate electrodes to the body a capacitor having one-half the capacitance of the previously described capacitors would be produced. In other words you would have two capacitors in series which would in fact halve the capacitance of the unit.

An alternate method of manufacturing electrical capacitors 30 (see FIGURE 3 of the drawings) is to secure an electrical lead 34, for example, by welding or soldering a metal deposit 36 to the body 31 of metal as the first step in the process before the oxidizing step is performed. In this way after the dielectric layer 32 is formed, an electrical connection exists to the inner electrode allowing the grinding or sandblasting to be omitted. Electrode 33a is bonded to the dielectric layer 32 by applying a silver paste thereonto and firing the same to fuse the glass in the silver paste. Terminal 35 is connected to the electrode 33a in a suitable manner.

While there have been illustrated and described what is at present considered to be preferred embodiments of the present invention and a method of making the same, it will be appreciated that numerous changes and modifications are likely to occur to those skilled in the art, and it is intended in the appended claims to cover all those changes and the modifications which fall within the true spirit and scope of the present invention.

The invention claimed is:

1. The method of making an electrical capacitor comprising: the steps of
    firing a body of tantalum having parallel ends in an oxidizing atmosphere for from 5 to 30 minutes at 700–900° C. to oxidize the outer layer of the body;
    impregnating the outer portion of the oxide layer with a liquid lead resinate;
    refiring the body at 700–900° C. for from 5 to 10 minutes to recompose the resinate; and form a dielectric layer on the body of tantalum comprising an inner layer of the oxide of tantalum and an outer layer of lead tantalate, and
    attaching an electrode to the portion of the dielectric layer covering one of the ends to produce the electrical capacitor.

2. The method of claim 1 in which a portion of the dielectric layer is removed from the other end exposing a section of the unoxidized tantalum and another electrode is attached to the exposed section of the body of tantalum.

3. The method of claim 1 in which a terminal is attached to the body of tantalum before it is fired.

4. The method of making an electrical capacitor comprising: the steps of
    firing a body of titanium having parallel ends in an oxidizing atmosphere for from 5 to 30 minutes at 700–900° C. to oxidize the outer layer of the body;
    impregnating the outer portion of the oxidized layer of the fired body with a liquid lead resinate;
    refiring the body at 700–900° C. for from 5 to 10 minutes to decompose the resinate and form a dielectric layer on the body of titanium comprising an inner layer of the oxide of titanium and an outer layer of lead titanate,
    attaching an electrode to the portion of the dielectric layer covering one of the ends to produce the electrical capacitor.

5. The method of claim 4 in which a portion of the dielectric layer is removed from the other end exposing a section of the unoxidized titanium and another electrode is attached to the exposed section of the body of titanium.

6. The method of claim 4 in which a terminal is attached to the body of titanium before it is fired.

7. An electrical capacitor comprising a body of tantalum, a dielectric film bonded to the body of tantalum comprising an oxide of tantalum and lead tantalate, the lead tantalate being bonded to the oxide of tantalum, and an electrode secured to the dielectric film.

8. An electrical capacitor comprising a body of titanium, dielectric film bonded to the body of titanium comprising, an oxide of titanium and lead titanate, the lead titanate being bonded to the oxide of titanium, and an electrode secured to the dielectric film.

References Cited by the Examiner

UNITED STATES PATENTS

| | | | |
|---|---|---|---|
| Re. 24,191 | 7/56 | Jaffe | 252—63.5 |
| 603,722 | 5/98 | Bradley | 317—258 |
| 1,900,018 | 3/33 | Lillienfeld | 317—258 |
| 1,947,112 | 2/34 | Ruben | 317—258 |
| 2,299,228 | 10/42 | Gray | 317—258 |
| 2,369,327 | 2/45 | Wainer | 317—258 |
| 2,871,428 | 1/59 | Shen | 317—258 |
| 2,930,951 | 3/60 | Burger | 317—242 |
| 2,972,180 | 2/61 | Gulton | 29—25.42 |
| 3,066,247 | 11/62 | Robinson | 317—258 |
| 3,093,883 | 6/63 | Haring. | |

LARAMIE E. ASKIN, *Primary Examiner.*

JOHN F. BURNS, *Examiner.*

UNITED STATES PATENT OFFICE
CERTIFICATE OF CORRECTION

Patent No. 3,191,108                                      June 22, 1965

Otis F. Boykin

It is hereby certified that error appears in the above numbered patent requiring correction and that the said Letters Patent should read as corrected below.

Column 1, line 61, for "occompanying" read -- accompanying --; column 4, line 35, for "recompose" read -- decompose --; column 5, line 2, before "dielectric" insert -- a --.

Signed and sealed this 18th day of January 1966.

(SEAL)
Attest:

ERNEST W. SWIDER
Attesting Officer

EDWARD J. BRENNER
Commissioner of Patents